N. ROSENQVIST.
MILKING MACHINE.
APPLICATION FILED NOV. 23, 1910.

1,014,331.

Patented Jan. 9, 1912.

3 SHEETS—SHEET 1.

Inventor
Nils Rosenqvist
by Harold Serrell
his atty

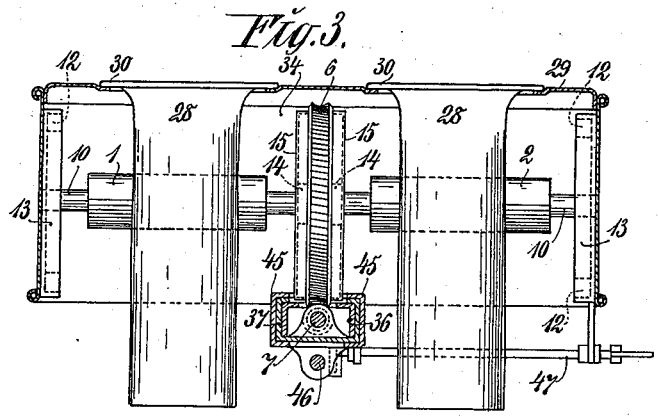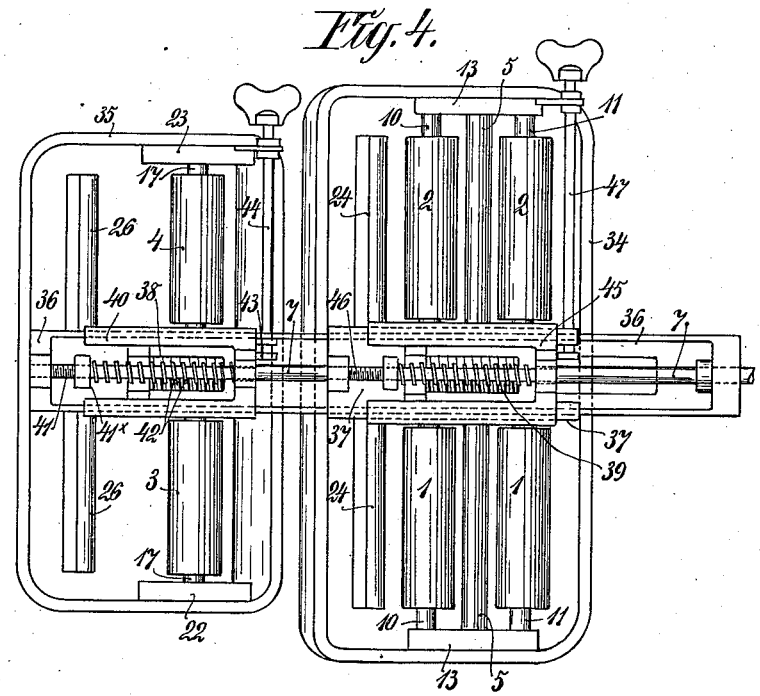

N. ROSENQVIST.
MILKING MACHINE.
APPLICATION FILED NOV. 23, 1910.
1,014,331.
Patented Jan. 9, 1912.
3 SHEETS—SHEET 3.
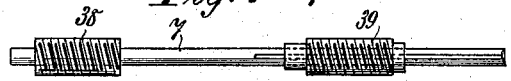
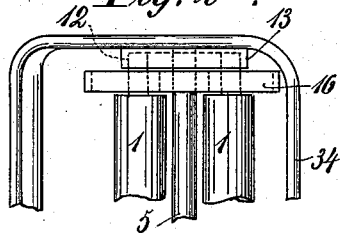
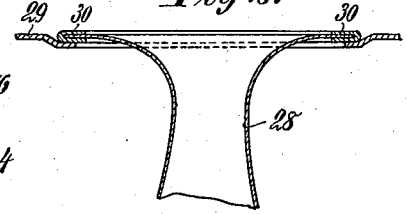
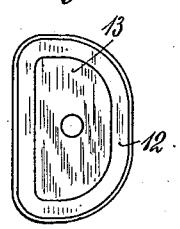
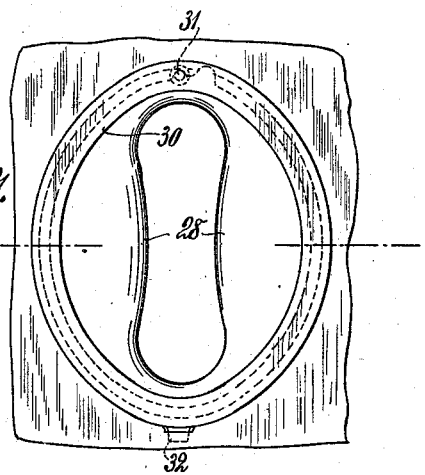

UNITED STATES PATENT OFFICE.

NILS ROSENQVIST, OF STOCKHOLM, SWEDEN.

MILKING-MACHINE.

1,014,331.

Specification of Letters Patent. Patented Jan. 9, 1912.

Application filed November 23, 1910. Serial No. 593,787.

*To all whom it may concern:*

Be it known that I, NILS ROSENQVIST, a subject of the King of Sweden, and resident of Odengatan 44, Stockholm, in the Kingdom of Sweden, have invented certain new and useful Improvements in Milking-Machines, of which the following is a specification, reference being had therein to the accompanying drawings.

This invention relates to a milking machine, which, owing to its very simple construction especially of the driving means for the parts compressing the teats or the milking elements is very easy to manage and can easily be adjusted with relation to the very varying distance between the front and the rear teats. The milk is forced out of the teats by rollers, which are moved in closed paths and extend transversely of the teats and pass along the same from their top downward, while rotating. The front teats are acted upon by rollers, circling around a common driving shaft, while the rear teats are acted upon by rollers, which circle around another driving shaft. Both the said shafts are provided with worm wheels meshing with a common worm, journaled in the casing of the machine and extending longitudinally of the same, which worm is rotated in any suitable manner. Suitable curtains protect the teats from coming in direct contact with the rollers and are suspended in the machine in a special manner, so that any stretching of the teats injurious to the same is obviated.

Figure 1:
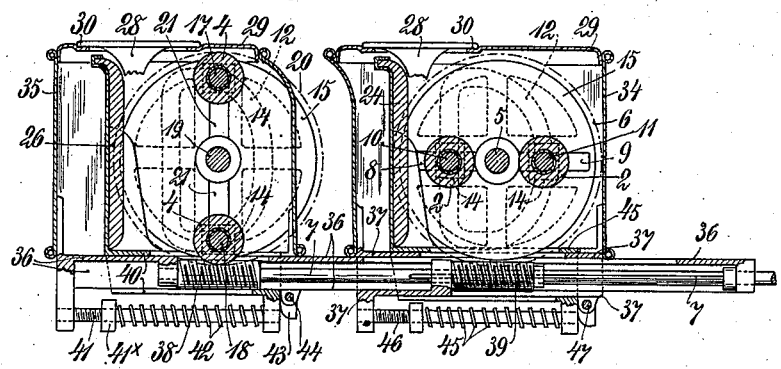
Figure 2:
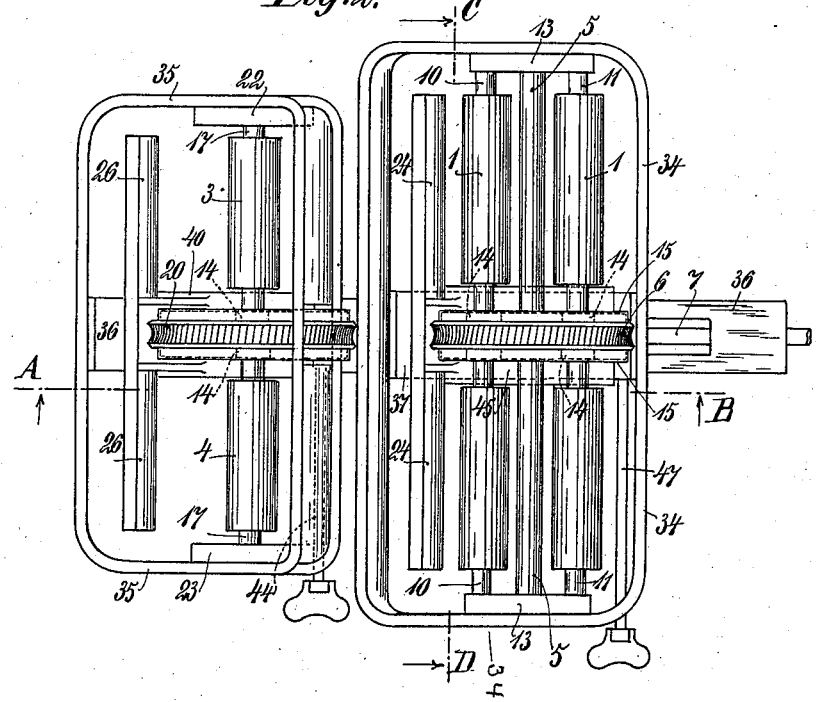

In the accompanying drawings a milking machine arranged in accordance with this invention is shown, in Figure 1 in a longitudinal section on the line A—B of Fig. 2, and in Fig. 2 in a plan view. Fig. 2ª is a detail. Fig. 3 is a cross section on the line C—D of Fig. 2. Fig. 4 illustrates the machine viewed from below. Fig. 4ª is a detail. Fig. 5 shows one of the groove disks guiding the rollers. Fig. 6 is a sectional view and Fig. 7 is a plan view, illustrating the manner, in which the curtain is suspended.

Each teat is acted upon by two rollers, one following the other. The two pairs of rollers 1, 1 and 2, 2 act upon each of the front teats respectively, and the two pairs of rollers 3, 3 and 4, 4 act upon each of the rear teats respectively. The front rollers are acted upon by the horizontal, transversal shaft 5, which is provided with a worm wheel 6 meshing with the driving shaft 7, which extends longitudinally of the machine and is journaled in the bottom part of the same and is rotated in any suitable manner. The said worm wheel is provided with grooves 8, 9, through which the shafts 10, 11 of the rollers, parallel to the shaft 5 and located on opposite sides of the same, are threaded. The rollers are guided by grooves 12 which are provided in two stationary disks 13, 13, located at each side of the machine. The said grooves 12 are engaged by the ends of the shafts 10 and 11. As illustrated in Fig. 2 the shafts 10 and 11 respectively are common to two rollers 1, 2, one of the rollers belonging to one of the pairs of rollers mentioned above and the other roller belonging to the other pair of rollers. The grooves 8, 9 are straight and coincide with the diameter of the worm wheel 6, so that the shafts 10, 11 and the rollers loosely mounted on the same can move toward and from the shaft 5 while partaking in the rotary movement of the wheel 6. Each of the grooves 12 forms a closed curved line, the shape of which is adapted to the movement around the shaft 5, which is to be imparted to the roller, so that the roller, when in its upper position opposite to the root of the teat, is moved straight against the teat, supported by a resilient disk located at the opposite side of the teat, then is moved downward along the teat for effecting the pressure on the same necessary for forcing out the milk, again is removed from the teat and finally returns to its starting position. The shafts of the rollers are provided with two large flanges 14, one at each side of the wheel 6, which guide the roller shafts in such manner, that they can not occupy an oblique position with relation to the worm wheel. Owing to the facts that the shafts 10 and 11 are common to two rollers, acting simultaneously upon two teats, and that the driving wheel 6 is located at the center of the shaft of the rollers, between the same, the rollers will counterbalance each other, when pressing against the teats. In consequence thereof the machine can easily be run, so that the described, simple driving mechanism can be used. Protecting disks 15 are located at opposite sides of the wheel 6, covering the same. Disks, arms or the like may, besides, be provided at the ends of the shaft 5, provided with grooves for the shafts 10, 11, similar to the grooves 8, 9 and forming additional guides for the shafts 10 and 11. Fig. 2ᵃ shows one of the said guiding disks 16. The rear rollers 3, 3, 4, 4 and their shafts 17, 18 are actuated and guided in the same manner by a central shaft 19, provided at its center with a worm wheel 20 meshing with the shaft 7, and by grooves 21 in the said worm wheel and grooves, provided in stationary disks 22, 23, located at opposite sides of the machine, so that the rollers 3, 3, 4, 4 act upon the rear teats in the same manner as described above with reference to the front rollers.

The supports for the teats consist of resilient plates. The machine is provided with a supporting plate 24 of the said type, common to the front teats, and a rear plate 26 for the rear teats. Each of the said plates 24, 26 is fixed to a slide, described below. The roller does not bear against the teat directly but against a projecting hose shaped curtain 28, split if necessary and suspended in front of the supporting plate from the cover 29 of the machine, which is provided with openings for the teats. The said curtain is located in front of the plate mentioned above. The said curtain is shown in Fig. 3 and on a greater scale in Figs. 6 and 7 and is made, as usually of india rubber, cloth or any other suitable, flexible material. The top part of the curtain is expanded like a funnel by means of a ring 30. The shape of the cross section of the hose like curtain is oval, having its large axis parallel to the roller shaft. Before the fixing of the top edge of the curtain, it has been bent outward to a great extent in the direction perpendicular to the axis just mentioned, so that the side of the hose, as for the part bent outward, is comparatively long in the direction perpendicular to the roller but short in the direction parallel to the same, as shown in Fig. 7. This results in the material of the curtain during the stretching, effected by the roller, offering such a resistance at the short sides of the hose, that the teat is not stretched to a greater extent at the side facing the roller than at the opposite side, bearing against the supporting plate. The ring 30 is fixed in an opening provided for the teat in the cover in a detachable manner by means of a pin 31 and a pin 32 located opposite to the same, which pin 32 can be inserted into a notch provided in the wall of the opening by turning the ring 30 a short distance.

For increasing and decreasing the distance between the front rollers and the rear rollers the frame, in which the pairs of rollers are journaled, and the cover are divided transversally into two parts, so that the machine has two small frames 34, 35, each provided with a cover. The shaft 5, around which the front rollers circle, is journaled in one of the said frames 34, the guides for the rollers and the supporting plate for the front teats, etc., being also provided in the said frame 34. The rear rollers and the parts coöperating with the same are employed in the other frame 35. A central guide 36, extending forward, longitudinally of the machine, is firmly fixed to the lower side of the frame 35. The shaft 7 is journaled in lugs or the like, provided on the lower side of the guide 36, and extends longitudinally of the said rod. The frame 34 is mounted in a slidable manner on the guide 36 by means of a sleeve 37 embracing the guide 36, so that the frame 34 with the parts carried by the same can be moved toward and from the frame 35, whereby the distance between the front and the rear rollers is varied. The worm 38, meshing with the worm wheel 20, is fixed to the shaft 7 or made integral with the same. The worm 39, on the other hand, meshing with the worm wheel 6, is hollow and threaded on the shaft so that it can slide on the shaft longitudinally of the same, but is prevented from rotating on the shaft by a key engaging a groove provided in the same. As the frame 34 is moved on the guide 36, the worm 39 slides on the shaft 7 without rotating and consequently without causing the worm wheel 6 to rotate.

As shown in Fig. 1, the front rollers and the rear rollers are so positioned and timed that, when one pair of the front rollers act upon the teats, the rear rollers are out of contact with the rear teats and vice versa, so that the front and the rear rollers act alternately. Owing to this arrangement the resistance to be overcome by the driving power will never rise to an unnecessarily high degree. When the distance between the front and the rear rollers is increased or decreased by moving the frame 34 on the guide 36, the position of the rollers with relation to each other is not altered, owing to the fact that the worm 39 can slide on the shaft 7, so that the worm wheel 6 need not rotate, while the frame 34 is moved. A jam screw or the like may be provided for locking the frame 34 in its adjusted position on the guide 36.

The described arrangement may, evidently be modified in such manner, that the front part of the machine is firmly connected with the guide 36 and the rear part is adjustable along the same, in which case the worm 38 is made slidable on the shaft 7. Many other modifications are possible. For instance the whole shaft 7 with the exception of the worm 38 may be so arranged that it partakes in the movement of the frame 34, in which case the worm 39 must be fixed to the shaft 7 and the latter slidably mounted in the hollow worm 38 as well as in the lugs supporting the shaft. A further modification consists in the shaft 7 being screw-threaded in the usual manner, without being provided with the said movable worm, while one of the frames 34 and 35 is movable on the guide 36. In this case, however, the shaft 7 must be rotated during the adjusting operation. The construction of the guide 36 may be modified. For instance it may consist of two parallel rods or the like. Both the said worms may be hollow and threaded on the shaft, for facilitating the manufacturing of the parts.

A sleeve 40 is located on the guide 36. The rear support 26 is fixed to the said sleeve 40, which loosely embraces a screw threaded rod 41, which is fixed to the guide 36 and is parallel to the same. A spiral spring 42, wound around the rod 41, tends to move the sleeve forward against an abutment. The tension of the said spring can be adjusted by means of a nut 41$^x$. The support 26 is rendered resilient by the said arrangement, so that it can yield for the pressure from the roller, owing to the fact that the sleeve 40 can slide on the rod 41, while compressing the spring 42. Consequently, an even (uniform) pressure on the teat is effected by the roller. The said arrangement is of great importance, for, as the spring can be compressed to a very great extent, the teat can not be subjected to an unsuitably great pressure by the rollers, and by the said arrangement and by properly adjusting the tension of the spring the advantage is gained of no further adjustment (by means of the nut 41$^x$) being necessary for different cows with respect to their quality of being more or less easily milked. The abutment for the sleeve 40, mentioned above, can be arranged in different manners and may, for instance, consist of a cam disk 43, provided on a short transversal shaft 44, journaled on the guide 36 and provided with a small handle. By rotating the said shaft 44 the support for the teat can be moved into a rear position, as the teats are to be inserted into the curtains. The front support 24 for the teats is arranged in a similar manner, so that it can yield, but the sleeve 45, to which the said abutment is fixed, is threaded on the sleeve 37 in a slidable manner, and the screw threaded rod 46 and the shaft 47 are carried by the sleeve 45.

In the drawings two rollers act upon each of the teats, but the number of rollers may, evidently, be changed, for instance three rollers may be used, located at equal distances from each other, without causing any change in the driving mechanism, which together with the method in which the curtains are fixed and the manner, in which the machine is adjusted, form the most essential features of the machine.

To the lower side of the machine a concave bottom plate (not shown in the drawings) or the like may, as usually, be fixed, for leading the milk to a receiver. Also the said bottom is divided transversely, so that the adjustment of the machine described above can be effected.

I claim as my invention:

1. In a milking machine and in combination, a guide, a pair of frames, one of which is secured to said guide and the other is adjustable thereon, a drive shaft, a worm wheel in each frame, a worm fixed on said drive shaft and meshing with the worm wheel in the said fixed frame, a worm shiftable on said drive shaft and meshing with the worm wheel in the adjustable frame, a roller shaft for each worm wheel passing through a slot therein, a pair of rollers on each roller shaft, one on each side of its worm wheel, means in each frame for causing the rollers therein to travel in a vertically downward path during a portion of each revolution of their worm wheel and in a curved upward path during another portion of each revolution of their worm wheel, means in each frame for coacting with the rollers therein for effecting the milking, the said rollers in said frames being set so that the rollers in one frame act alternately to those in the other frame.

2. In a milking machine and in combination, a guide, a pair of frames, one of which is secured to said guide and the other is adjustable thereon, a drive shaft, a worm wheel in each frame, a worm fixed on said drive shaft and meshing with the worm wheel in the said fixed frame, a worm shiftable on said drive shaft and meshing with the worm wheel in the adjustable frame, a roller shaft for each worm wheel passing through a slot therein, a pair of rollers on each roller shaft, one on each side of its worm wheel, means in each frame for causing the rollers therein to travel in a vertically downward path during a portion of each revolution of their worm wheel and in a curved upward path during another portion of each revolution of their worm wheel, and means in each frame for coacting with the rollers therein for effecting the milking.

3. In a milking machine and in combination, a guide, a pair of frames, one of which is secured to said guide and the other is adjustable thereon, a drive shaft, a worm wheel in each frame, a worm fixed on said drive shaft and meshing with the worm wheel in the said fixed frame, a worm shiftable on said drive shaft and meshing with the worm wheel in the adjustable frame, a roller shaft for each worm wheel passing through a slot therein, a pair of rollers on each roller shaft, one on each side of its worm wheel, means in each frame for causing the rollers therein to travel in a vertically downward path during a portion of each revolution of their worm wheel and in a curved upward path during another portion of each revolution of their worm wheel, an oval band or ring secured in the top of each frame, and a curtain stretched over said band in each frame and extending downward therefrom and coacting with the rollers therein for effecting the milking, the said rollers in said frames being set so that the rollers in one frame act alternately to those in the other frame.

4. In a milking machine and in combination, rollers circling in a vertical plane and acting upon the front teats, another set of rollers circling in a similar manner and acting upon the rear teats, a guide for the said rollers, resilient supports for the teats, shafts around which the rollers circle, a pair of frames, a central guide fixed to one of said frames at right angles to said shaft, and upon which the other of said frames is adjustable, worm-wheels embracing the said roller shafts, a drive shaft engaging the said worm wheels, sliding members movable upon said central guide and to which said supports for the teats are fixed, rods mounted along the said central guide, spiral springs surrounding said rods, said rods being embraced in a slidable manner by said supports actuated by said springs toward the rollers, and means for adjusting the supports to allow the teats to be inserted into the machine.

In witness whereof, I have hereunto signed my name in the presence of two subscribing witnesses.

NILS ROSENQVIST.

Witnesses:
HEDING MELINDER,
GUSTAF ISFALL.

---

Copies of this patent may be obtained for five cents each, by addressing the "Commissioner of Patents, Washington, D. C."